United States Patent
Levchin et al.

(10) Patent No.: US 7,249,094 B2
(45) Date of Patent: Jul. 24, 2007

(54) SYSTEM AND METHOD FOR DEPICTING ON-LINE TRANSACTIONS

(75) Inventors: Max Levchin, Palo Alto, CA (US); Robert Frezza, Stanford, CA (US)

(73) Assignee: PayPal, Inc., Mountain View, CA (US)

( * ) Notice: Subject to any disclaimer, the term of this patent is extended or adjusted under 35 U.S.C. 154(b) by 1250 days.

(21) Appl. No.: 09/793,843

(22) Filed: Feb. 26, 2001

(65) Prior Publication Data
US 2002/0156724 A1 Oct. 24, 2002

(51) Int. Cl.
*G06Q 40/00* (2006.01)
(52) U.S. Cl. .............................. 705/39; 705/35; 705/36; 705/37; 705/38; 705/40; 705/64; 705/75
(58) Field of Classification Search .................. 705/35, 705/36, 38, 39, 40, 64, 75, 37
See application file for complete search history.

(56) References Cited

U.S. PATENT DOCUMENTS

| | | | | |
|---|---|---|---|---|
| 5,819,226 A | * | 10/1998 | Gopinathan et al. | 705/44 |
| 5,950,179 A | * | 9/1999 | Buchanan et al. | 705/38 |
| 5,963,922 A | * | 10/1999 | Helmering | 705/35 |
| 6,094,643 A | * | 7/2000 | Anderson et al. | 705/44 |

| | | | |
|---|---|---|---|
| 2001/0010730 A1 | 8/2001 | Rhoads | |
| 2001/0037316 A1 | 11/2001 | Shiloh | |
| 2002/0072993 A1 | 6/2002 | Sandus et al. | |

FOREIGN PATENT DOCUMENTS

JP 355110367 8/1980

* cited by examiner

*Primary Examiner*—Nga Nguyen
(74) *Attorney, Agent, or Firm*—Park, Vaughan & Fleming LLP

(57) ABSTRACT

A system and methods are provided for depicting on-line transactions. Transactions may be represented as a connected graph with various visual and/or aural attributes indicating different statuses for various transaction parameters. Nodes may represent entities providing or receiving value, while edges represent transactions conducted between entities. The relative magnitude of value of a transaction may be represented by the thickness or pattern of an edge, while a time period during which it occurred may be indicated by color. Different types of entities may be represented by nodes of different shapes, and/or specific entities within a type may have other unique attributes (e.g., color, size). A graph may be generated by starting with an initial account, entity or transaction that meets one or more criteria (e.g., value amount, frequency of activity). The system may then trace the source and/or destination of value transferred from/to the initial entity to identify a set of related or connected transactions.

38 Claims, 8 Drawing Sheets

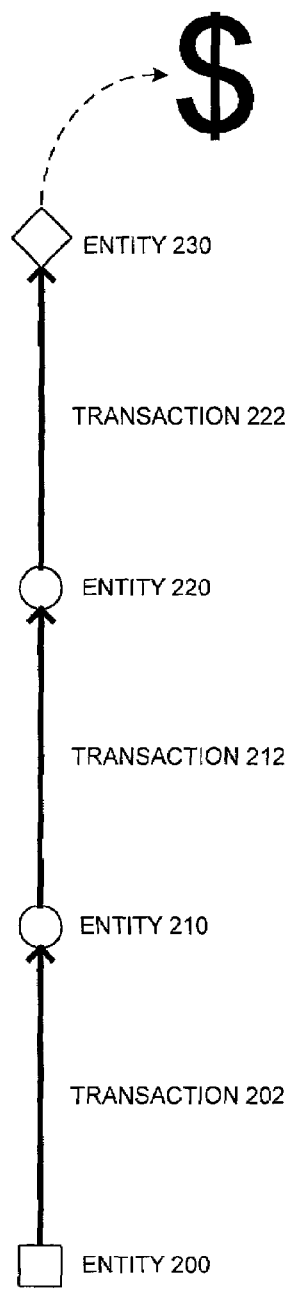
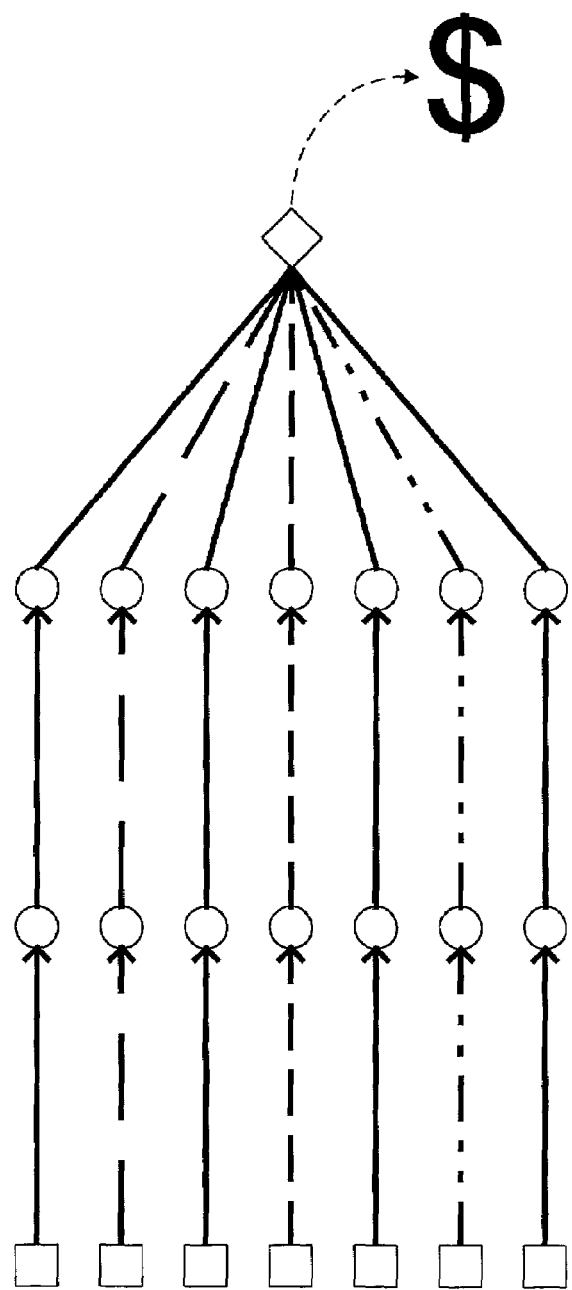
FIG. 2A  FIG. 2B

SYSTEM AND METHOD FOR DEPICTING ON-LINE TRANSACTIONS

BACKGROUND

This invention relates to the fields of computer systems and electronic commerce. More particularly, a system and methods are provided for depicting or representing on-line transactions (e.g., visually, aurally) in order to facilitate analysis of the transactions for fraud and other purposes.

As the on-line community expands, the number and value of electronic financial transactions conducted on-line will likely keep pace. More specifically, on-line purchases of goods and services and transfers of funds are becoming more and more popular. Part of the reason for the increased willingness to conduct such transactions on-line is that there is an increasing perception that such transactions are conducted safely, and that the risk of loss of funds or financial data is steadily decreasing.

In reality, however, on-line fraud is, if not pervasive, then at least a significant concern to the entities most likely to bear the burden of that fraud. In particular, merchants that accept credit card transactions on-line run the risk of a chargeback with each such transaction. In a chargeback, the merchant that accepted a credit card as payment for a good or service is not paid or reimbursed for the transaction. When the credit card is stolen, for example, the rightful holder of the credit card is absolved of responsibility for charges made by the thief, and the merchant loses the merchandise that was "purchased." In order to keep their account holders placated, credit card issuers are usually quite willing to assess a chargeback to a merchant when an account holder alleges that his or her credit card was stolen, cloned or otherwise used without permission.

Some on-line merchants or entities may be at more risk than others, or may be more attractive targets to credit card thieves and unscrupulous credit card holders. In particular, on-line businesses now exist that allow one person or entity to transfer money to another person or entity, on-line, and charge the amount of the transfer to his/her/its credit card. A chargeback may be made as late as six months after the charge transaction occurs, and the recipient naturally expects to receive the funds very soon after the transaction. Therefore, with very little time to verify that a credit card that appears valid (e.g., the credit card number is authentic and/or is issued to the person or entity allegedly conducting the transaction) actually is valid, the on-line business is at substantial risk of losing the funds that it credits to the recipient.

Thus, what is needed is a method of detecting fraudulent on-line transactions that attempt to transfer money from or charge funds to an invalid or stolen credit card or other financial account or instrument.

SUMMARY

In one embodiment of the invention a system and methods are provided for depicting a set of related transactions. The resulting depiction may then be used to analyze the transactions for fraudulent activity, demand on system resources, and other purposes. The system may be implemented as part of an on-line transaction system that facilitates the transfer of value between entities (e.g., credit cards, bank accounts, user accounts).

In one method of depicting transactions, a first transaction (involving a transfer of value from a first entity to a second entity) is selected from a collection (e.g., a database) of stored transactions. Various parameters concerning the transactions may be stored, such as the amounts of value that were transferred, the time/day of each transfer, the entities involved in each transfer, etc. From the selected transaction, the preceding flow of value to the first entity, and/or the subsequent flow of value from the second entity may be traced. The traces may be conducted to find the initial source(s) of the value (e.g., one or more credit cards) or the ultimate destination(s) of the value (e.g., user accounts from which the value may be withdrawn), or any intermediate entities. In addition, traces may branch off from these traces to find sources, destinations and/or intermediate entities involved in the transfer of other value. Thus, the tracing process identifies a set of related, or connected, transactions.

The related transactions are then depicted in a manner understandable by a human analyst or operator. In one embodiment of the invention, the transactions are visually depicted as a connected graph, wherein each edge of the graph represents one transaction (e.g., one transfer of value) and connects nodes representing the entities involved in the transaction. Visual attributes (and, possibly, aural or other attributes) of the depiction are set to correspond to various parameters of the depicted transactions. Thus, the size or thickness of an edge may depict the relative amount of value transferred, while the color of the edge may represent a time period during which the transfer occurred. The shape of a node may depict a type of entity, while the color of the node may represent a sub-type or particular entity (e.g., a VISA™ credit card, an account at XYZ bank).

The human analyst may expand or shrink a depiction by performing additional tracing, adding or removing transaction details, changing the mapping of visual or other attributes to transaction details, etc. The analyst may then search the depiction for evidence of fraudulent activity (e.g., indications that multiple, stolen, credit cards are being charged), compare the depiction or a portion of the depiction to known or suspected patterns of fraudulent activity, etc.

DESCRIPTION OF THE FIGURES

FIGS. 2A-2B depict sets of related transactions in accordance with an embodiment of the invention.

DETAILED DESCRIPTION

Figure 1:
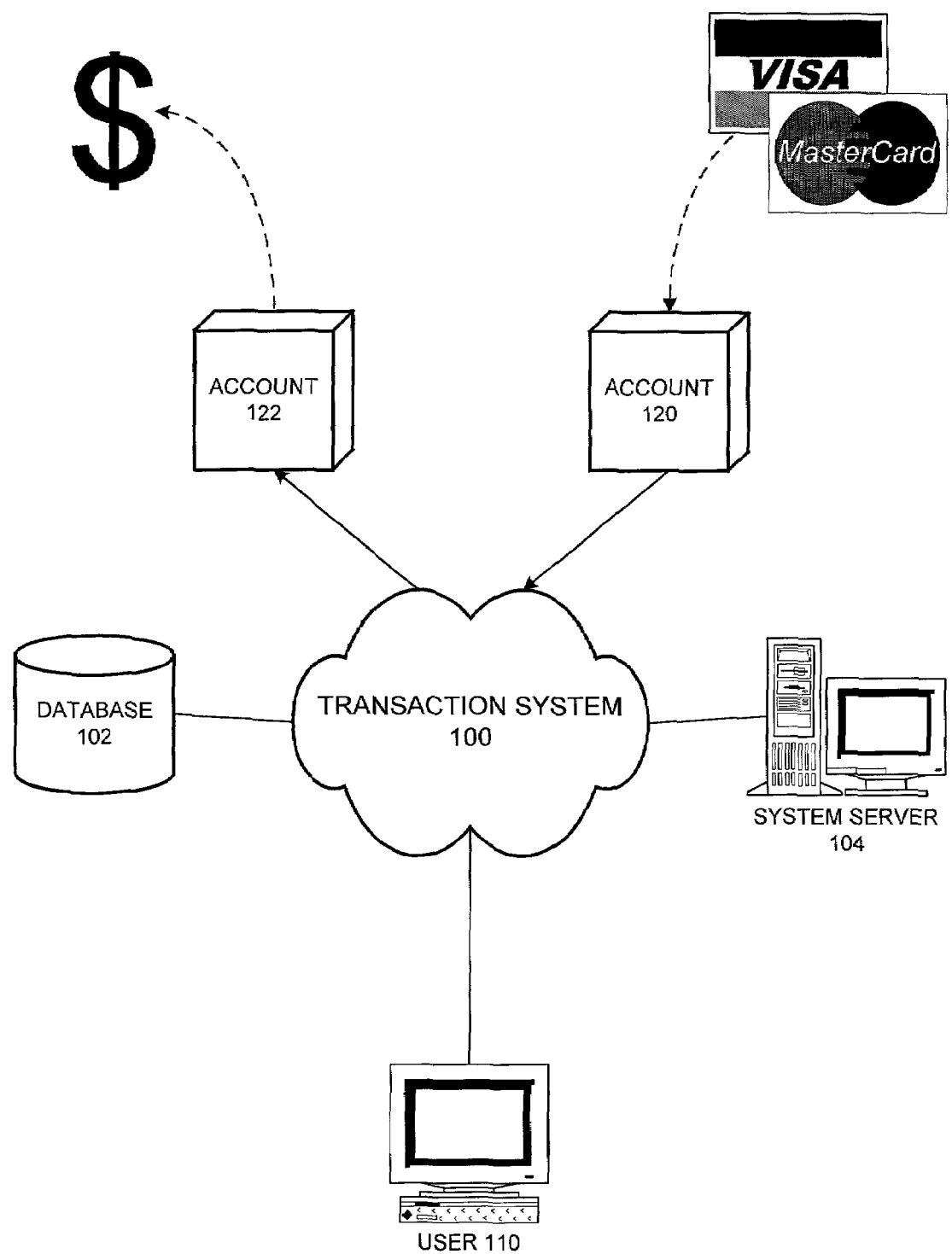
FIG. 1 is a block diagram depicting an on-line transaction system in which an embodiment of the present invention may be implemented.

The following description is presented to enable any person skilled in the art to make and use the invention, and is provided in the context of particular applications of the invention and their requirements. Various modifications to the disclosed embodiments may be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage and display) are well known and may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention, a system and methods are provided for depicting or representing on-line transactions to facilitate analysis of the transactions for fraud or other patterns of activity. In this embodiment, the transactions may be depicted visually, aurally or with some combination of human-appreciable media. A depiction of a set of interrelated or connected transactions may then be compared to known or suspected patterns of fraudulent activity or other notable behavior. In other embodiments of the invention, the transactions may be represented in ways designed for automated (e.g., computer-based) analysis.

One or more embodiments of the invention described below may be particularly suitable for an on-line transaction system that allows users to transfer money or other value between themselves (or between user accounts). Illustratively, the transaction system may be part of an on-line merchant or retail site but, in one embodiment, differs from these types of systems in that the transactions that are conducted between entities involve just the transfer of money (or other liquid value). Thus, in a typical transaction in such a system, a first entity, or transferor, transfers a specified amount of value (e.g., money, credit, vouchers, coupons, frequent flier points) to a second entity, or transferee. The entities may conduct their value transfers using accounts created for them by the system, or they may use external financial accounts, such as credit cards, bank accounts, etc. to make or receive a transfer. Value may be initially deposited or transferred into the system from virtually any type of financial account or instrument and may exit the system electronically, to an external account, or may be removed in the form of paper check or other negotiable instrument.

Even if the on-line system limits the amount of value that can be transferred in a single transaction, dishonest or unscrupulous users of the system may perform many transactions using fraudulent accounts or financial instruments (e.g., credit cards) that do not belong to them. Thus, a credit card thief, whether she steals the credit card numbers on-line or obtains them in the "real" (or off-line) world, may use them as the source of one or more value transfers to system accounts that she controls. From those accounts, other transfers may be made and the value may eventually be withdrawn from the system.

Because credit card holders are generally absolved of liability for fraudulent use of their accounts in on-line credit card transactions (sometimes referred to as "card not present" transactions), the on-line system may be assessed chargebacks for each fraudulent transfer. By employing an embodiment of the invention to depict on-line transactions for human comparison to known or suspected patterns of fraud, the on-line system may be able to prevent a fraud artist from absconding with finds that would be charged to the system. In alternative embodiments of the invention, various amounts of fraud detection may be automated (e.g., analysis of transaction patterns that exactly match known patterns of fraud).

FIG. 1 depicts an on-line value transfer system for which an embodiment of the invention may be implemented. Transaction system 100 enables users of the system to transfer value between themselves using accounts that are maintained by the system. Thus, separate users may have separate accounts on the system, although one user may have more than one account. Two user accounts 120, 122 are shown in FIG. 1. User accounts may receive value infusions from other users' accounts as well as external entities and institutions, such as credit cards, debit cards, bank accounts, etc. Similarly, value may be removed from the system by paper check, an ACH (Automated Clearinghouse) transaction to an external financial institution (e.g., a bank), a credit to a credit card, etc.

Transaction system 100 in this embodiment includes database 102, which may be configured to store transactions for analysis and/or archival and other purposes. System 100 also includes system server 104 for performing various tasks, which may include analyzing transactions, performing transactions, communicating with users and/or external entities, etc.

For example, user 110 may connect to system 100 via the Internet, direct connection or other link, and initiate a value transfer, add money or other value to his account, remove value from his account, check an account status, etc. User 110 may, for example, own account 120 and connect to the system in order to perform a value transfer from account 120 to account 122, which may belong to user 110 or some other user.

A typical value transfer transaction may involve only two parties, a transferor and a transferee, although it may also be possible to include more than just one transferor and/or transferee. In addition, a receiver or transferee of value in a first transaction may turn around and act as a giver or transferor in a later transaction. Thus, transaction chains, threads or limbs may be created as value is transferred from a first entity to a second entity to a third entity, etc. Illustratively, a transaction chain may include any number of consecutive transactions and may trace the transfer of value (e.g., in varying or identical amounts) from one entity or user to any other entity.

A user may exhibit various levels of activity. Thus, one user may perform value transfers on an infrequent basis, while another user may conduct frequent value transfers. For example, a user who employs his on-line account to send or receive payment for merchandise purchased or sold on-line (e.g., through an on-line auction system) may legitimately perform numerous value transfers with various other users. A fraud artist may, however, employ any number of system accounts for the purpose of obtaining value from stolen credit cards or from other sources.

System 100 may employ various security measures and procedures to protect on-line transactions, ensure that users' accounts are secure, verify new users' identities, etc. In the interest of ease-of-use of the system, however, a new user may only need to provide minimal information in order to open an account. For example, it may be sufficient for a user attempting to open a new account to provide proof of having a bank account (in a traditional or on-line bank) and a unique electronic mail address, telephone number or other identifier. Users and/or accounts may be assigned unique identities or, alternatively a unique identifier provided by the user (e.g., electronic mail address) may be adopted.

In accordance with a present embodiment of the invention, system 100 may analyze value transfer transactions for fraud before completing or closing them. One type of fraud that may be searched for is the unauthorized use of a credit card or the use of a stolen credit card. However, because of the desire for rapid closure, the system may have only a minimal amount of time to perform the analysis. Because the number of transactions conducted by the system could number in the hundreds of thousands, or more, per day, it is desirable to enable rapid analysis and fast detection of fraudulent activity.

Transaction analysis is also complicated by the number and variety of transaction details that may be relevant to identifying fraud. For example, some of the parameters that an on-line transaction system may track or examine may include: amount of value transferred, identities of transferor and transferee, other data concerning the parties (e.g., geographic location, network address, how long their accounts have existed, number of previous transactions), time/date of transfer, type of financial instrument (e.g., credit card, debit card, check, ACH request), the good or service (if any) received in exchange for the transfer, etc. The parameters that are useful in one analysis (e.g., to detect fraudulent value transfers) may not be the same ones that are helpful in another analysis (e.g., to plan for system growth or expansion).

In addition, examining one transaction in isolation may uncover little, if any evidence of fraudulent activity. It may be necessary to examine related or connected transactions, which may be defined to include transactions within the same transaction chain and/or another intersecting chain. Illustratively, one chain intersects another if they include a common entity (e.g., user, credit card, bank account).

Transaction chains may be constructed as value is traced backward (e.g., in time) to a source or earlier transferor, and/or forward to a destination or later transferee. Illustratively, a backward trace may be termed an "inflow" trace, while a forward trace may be termed an "outflow" trace. Starting from one transaction or one entity, inflow and outflow traces may be conducted to generate a web, graph or other collection of related or connected transactions. In particular, a transaction or value transfer may be traced in one direction to find a source (e.g., where the value originally entered the system) or a destination (e.g., where the value exits the system), and then additional transaction chains may be constructed as traces are conducted in the opposite direction from that source or destination. Of course, a transaction chain may also be traced or added at some point between the endpoints of a first chain—to find the source or destination of some other value that was introduced or removed during the chain, for example.

In one embodiment of the invention, a collection of related transactions, or some subset of the entire collection, may then be compared to known or suspected patterns of fraudulent activity. This effort may be partly or fully automated, but the complexity of the problem, the amorphous nature of fraudulent activity and the need for flexibility may argue for human attention or investigation. More particularly, automated systems (e.g., computers) may be limited in the level of analysis they can perform, depending on their processing power, the desired depth or level of analysis, the number of transactions to be analyzed, the amount of time available, etc. For example, they may be helpful in performing an initial sorting or selection of suspect transactions based on selected criteria. However, comparing every portion or subset of a set of related transactions to every known/suspected fraud patterns, when dealing with over 100,000 transactions per day (and increasing each week) and considering the myriad transaction details and patterns of fraud, may not be solvable with existing computing resources.

Thus, to aid a human's analysis or investigation, in a present embodiment of the invention a graphical depiction of a set of related value transfer transactions is generated. The depiction need not, however, be strictly graphical or visual. Audible alerts/signals and other sensory inputs may also be employed. One goal, however, may be to associate the various sensory inputs with relevant transaction parameters so that the human analyst may quickly absorb the parameters and compare the set of transactions to known or suspected patterns of fraud. This embodiment may also enable the analyst to perform additional tracing (e.g., inflow and/or outflow), add or remove transaction parameters to or from a depiction, change how the parameters are depicted, focus on just a portion of the depiction, etc.

In the presently described embodiment of the invention, the set of transactions may be depicted as a connected graph. Any number of individual transactions or smaller collections of transactions may be separately represented. Illustratively, however, each transaction may be represented as an edge connecting two nodes, and each node may represent a user, a financial institution (e.g., bank) or entity (e.g., credit card), etc. Thus, each transaction is separately represented, and each party to a given transaction can be readily identified.

Various visual attributes of each transaction and entity may be configured to indicate their statuses. For example, the thickness of an edge may indicate the relative magnitude of the value that was transferred in the transaction. The color of the edge may indicate a time period during which the transaction occurred. The shape of a node may indicate a particular type of entity (e.g., credit card, bank account, user, ACH transaction); a node color may indicate a particular credit card, bank or other type of entity. Various other attributes (e.g., edge pattern, flashing nodes or edges, whether a node is open or filled) may be employed, as may be devised by one of ordinary skill in the art, and the invention is not limited to any given set of attributes or any particular mapping between attributes and transaction parameters.

FIG. 2A demonstrates an illustrative transaction chain depicting the flow of value in a present embodiment of the invention. The illustrated chain depicts value transfers from a source entity, entity 200, to a destination entity, entity 230. Entity 200 may represent a credit card that is charged the amount of value transferred in transaction 202. Entity 230 may represent a paper check, a bank account or some other value-receiving or value-representing entity. Between entities 200, 230, entities 210 and 220 receive and forward the value that is ultimately removed from the system.

As described above, the transaction chain of FIG. 2A may be constructed piece by piece, starting from any entity or transaction, by conducting an appropriate inflow and/or outflow trace. This chain may be constructed if, for example, one or more of the constituent elements of the chain met any criteria used to identify transactions that may be suspected of including fraudulent activity. Illustrative criteria for selecting transactions for analysis are described below.

From the transaction chain of FIG. 2A, it may be difficult or impossible to determine with certainty that fraud is or is not indicated. The illustrated pattern of activity may be a legitimate transfer of value from one user's credit card to his account, another transfer from that account to another user's account, and the subsequent withdrawal of the value from that other user's account. Alternatively, however, the pattern of activity may reflect a thief's use of a stolen credit card to inject value into one dummy account, a transfer into another dummy account, and then a withdrawal. Illustratively, additional details of transactions in the chain may be added to try and make a clearer interpretation. For example, the depiction may be augmented with the network addresses of the computer systems or communication devices used to perform the transactions. If, for example, all of the transactions are done with one computer system, then the accounts may be dummy accounts manipulated by one person. Further, the physical addresses or identities of the users associated with the system accounts may be verified or investigated to determine if there are different users associated with them.

FIG. 2B is an illustrative depiction of a set of transactions that is more likely to include fraudulent activity. The depiction of FIG. 2B represents the use of numerous accounts and transactions to funnel value to a single entity, from which the combined value may be withdrawn. Depending on certain parameters, such as how short the time period is during which all of the transactions occur, it may seem even more likely that the illustrated depiction represents fraud. In particular, this depiction reflects the possible activity of a thief having possession of multiple stolen credit cards, whereby he launders value extracted from the cards through dummy accounts created just for the purpose of passing value onto another account. It is significant that all of the value that appears at the beginning, or bottom, of each chain exits at the end of the chain at a common entity (i.e., there are no forks or transfers outside of the pattern).

The types of entities involved in the transactions depicted in FIGS. 2A-2B are indicated by the shape of the nodes. Illustratively, a square may indicate a credit card, in which case the sources of value for each transaction chain in these figures are credit cards. Circles may represent user accounts on the system, while a diamond may represent a paper check or ACH transaction to remove money from the system. In addition, the size, line or fill pattern, color, or other attribute of a node may represent a more specific entity. For example, a half-filled square may represent a VISA™ credit card, an empty square may represent a MasterCard™ credit card, etc.

In FIGS. 2A-2B, the edge patterns (e.g., solid, dashed, dotted) may indicate the relative amount of value that is transferred in each transaction. Thus, each entity, after the initial entities, in each depicted transaction chain appears to receive the full amount of value held by the previous entity. Further, in these depictions the thickness of the edges may indicate a time period during which each transaction occurs. Depending on the total length of time involved in a given depiction, each separately distinguishable edge thickness may correspond to any period of time (e.g., one hour, one day, several days, a month). The depictions of FIGS. 2A-2B reflect uniform thickness, thereby indicating that all of the represented transactions occurred during one time period.

For a pattern such as that of FIG. 2B, where several different transaction chains are included, yet each one occurs close in time to the others, the likelihood of fraudulent activity increases. If, for example, this pattern was the result of legitimate retail or auction activity, it may be expected to reflect a longer period of time. Perpetrators of fraud normally tend to carry out their activities in a rapid pace, in order to avoid detection of their theft of credit cards and decrease the opportunity for a system operator to notice their activity.

The depictions of FIGS. 2A-2B are necessarily limited to black and white elements, but in actual embodiments of the invention color may be used to represent a transaction parameter. In particular, in an embodiment in which color is used to indicate time, a monochromatic depiction similar to the pattern of FIG. 2B would tend to indicate fraud, but if the pattern exhibited a rainbow or kaleidoscope of colors, thereby indicating the passage of a more significant period of time, then it may tend to indicate a lack of fraud.

Thus, by representing on-line transactions with visual or multi-media depictions, a human analyst can quickly review a transaction history or set of transactions in the hope of uncovering, and halting, fraudulent activity.

As mentioned previously, the system may begin the process of depicting transactions by selecting one or more transactions and/or entities to trace. Because of the vast number of transactions that may be performed in a given time period (e.g., a day), it may be helpful to select a starting set of transactions or entities based on some criteria. Alternatively, of course, starting points could be selected at random, depictions could be initiated for all transactions in a given time period (and then traced as desired), etc.

However, in a present embodiment of the invention, some of the criteria or factors that may be used to select a transaction or entity to begin tracing may include: amount of value transferred in a transaction (e.g., an amount close to a maximum), a chain of transactions performed in a short period of time, a number of transactions involving one account in a short period of time, a request for withdrawal of a large amount of value, amount of time between the time an account is opened and significant transactions occur (e.g., transfers of high value, numerous transactions), a chain of transactions in which each intermediate entity merely forwards the same amount of value it received, etc.

In different embodiments of the invention, various transaction parameters may be recorded, used to select starting points for analysis and/or represented in a depiction. Such parameters may include: amount of transaction, time/date of transaction, identities of entities involved, network addresses of the entities, etc.

Figure 3:
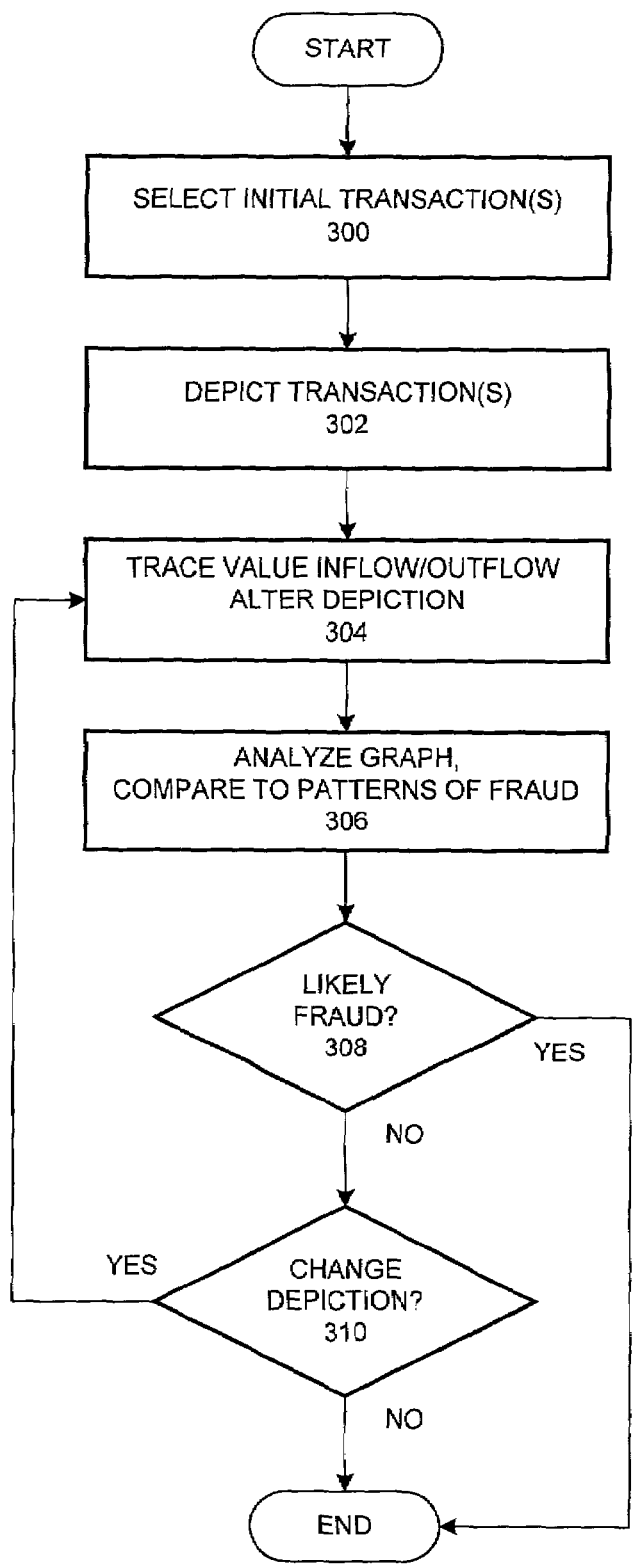
FIG. 3 is a flowchart demonstrating one method of depicting a set of related transactions in accordance with an embodiment of the present invention.

FIG. 3 demonstrates one method of depicting a set of related transactions with a connected graph, according to a present embodiment of the invention. In this embodiment, the transactions are depicted for the purpose of locating or identifying fraudulent activity (e.g., the use of a stolen credit card). The illustrated method draws upon a database of transactions accumulated by an on-line transaction system, and may be executed continuously, with a predetermined regularity, upon demand, etc.

In state 300, one or more initial transactions, transaction chains or entities are selected from the database based on one or more parameters. As described above, this initial selection may consider numerous different parameters. Therefore, the illustrated procedure may be executed multiple times using different parameters to select a starting point. Illustratively, however, the initial selection is made based on parameters that may be considered indicative of fraudulent activity. Thus, state 300 may involve locating transactions that involve the removal of a threshold amount of value from the system, the accumulation of a threshold amount of value in an account or other indicators of suspicious activity.

In state 302, a transaction in which value is transferred from one entity to another is visually depicted in what will become a connected graph representing multiple related transactions. The entities involved in the transaction (of which there may be two or more) are depicted as nodes connected by the edge(s) representing the transaction.

In this embodiment of the invention, some of the transaction parameters that may be represented (e.g., visually and/or aurally), and attributes that may be used to depict them, are listed in TABLE I. Any subset of these parameters and attributes may be used and, in addition, others not included in TABLE I may also be employed.

TABLE I

| Transaction Parameter | Depicted by |
| --- | --- |
| Amount of value transferred | Thickness or size of transaction edge |
| Date/time period of transaction | Color of transaction edge |
| Type of entity involved in transaction | Shape of node |
| Sub-type or specific entity | Color of node |
| Use of a single network address to perform multiple transactions | Pattern of transaction edge; flashing edge |

In state 304, a value inflow and/or outflow trace may be conducted. As the trace is conducted, the connected graph may grow as additional transactions and nodes are added. For example, starting from one transaction that meets the initial criteria (e.g., withdrawal of a threshold amount of value), one or more inflow traces may be conducted to trace all of the transaction chains through which the value was aggregated in one account. As another example, from another initial transaction an inflow or outflow trace may be conducted to find the ultimate source or destination, respectively, of the value that was transferred in the transaction. Then, traces may be conducted in the opposite direction to follow other value.

In state 306, the expanded depiction may be analyzed or compared to one or more patterns of known or suspected fraud (e.g., the depiction of FIG. 2B). This action may be conducted by a human operator in order to allow for flexibility. The operator may, for example, find the length of time during which the depicted activity to weigh for or against a determination of fraud, possibly based on other transaction parameters. The operator may wish to view additional details, which may be added to the depiction as necessary.

In state 308 the operator determines whether the depicted activity appears to include fraudulent behavior. If so, the illustrated procedure may end and the investigation may be taken off-line to initiate a more formal procedure (e.g., notify the police or other investigative authorities). If the operator determines that the present depiction does not appear to indicate fraud, the illustrated procedure may exit or continue at state 310.

In state 310, the operator may decide to alter the depiction by performing an additional trace, adding a transaction parameter (depicted by a new attribute), changing the parameter that is represented by a particular attribute, remove some detail, etc. If the depiction is to be altered, the illustrated procedure returns to state 304; otherwise, the procedure ends.

Illustratively, if a human (or automated) analyst determines that fraud has been identified, the system may freeze or place a hold on an account or transaction in order to prevent theft. Alternatively, all withdrawals from the system (or all withdrawals exceeding a threshold amount of value) may be automatically held or postponed for a period of time (e.g., one day) during which an embodiment of the invention may be implemented to search for fraud in the transactions preceding the withdrawal.

Figure 4:
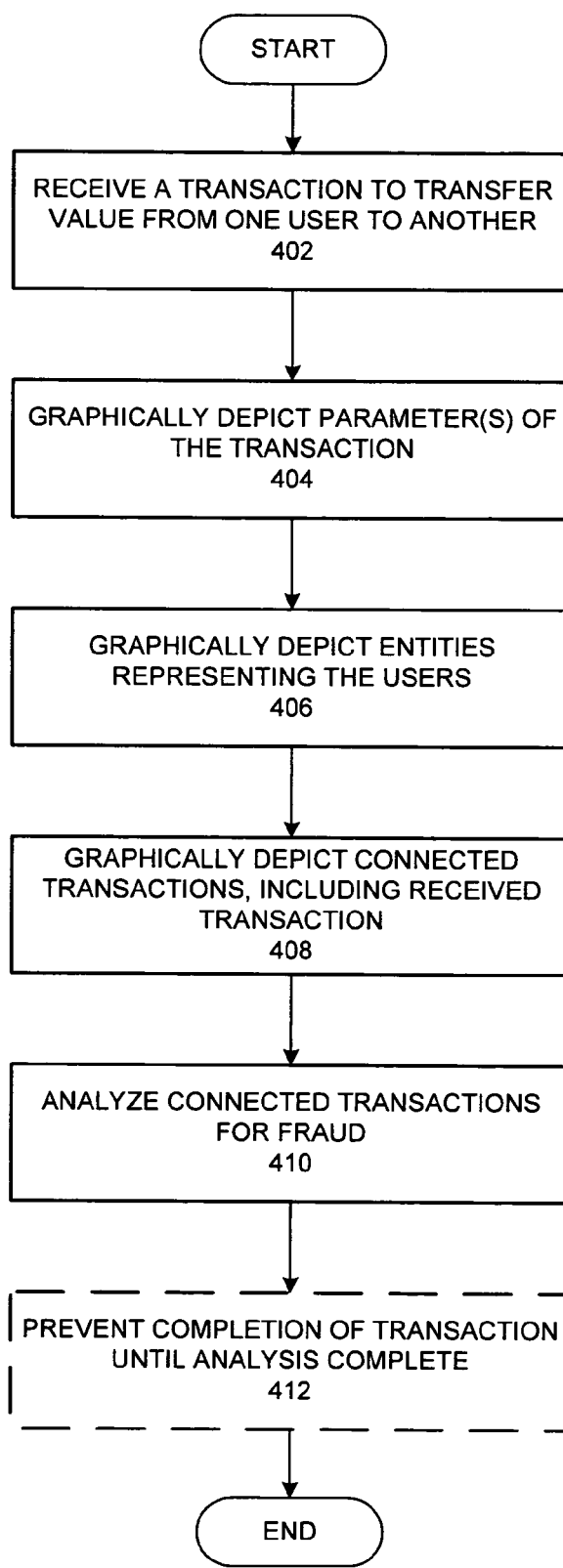
FIG. 4 is a flowchart demonstrating a method of depicting value-transfer transactions within a system for transferring value between users, in accordance with an embodiment of the present invention.

FIG. 4 depicts a method of depicting value-transfer transactions within a system for transferring value between users, in accordance with an embodiment of the invention. In operation 402, a first pending value-transfer transaction for transferring value from a first user to a second user is received from the first user. In operation 404, one or more parameters of the transaction are graphically depicted. In operation 406, entities representing the first and second user are graphically depicted. In operation 408, the first pending transaction and a set of connected transactions are graphically depicted. In this embodiment, two transactions are considered connected if they involve a common user and a transfer of value between that common user and at least one other user. In operation 410, the set of connected transactions is analyzed to determine if one or more of them may constitute fraud. In optional operation 412, a transaction may be prevented from closing until after the analysis of operation 410 is complete.

Figure 5:
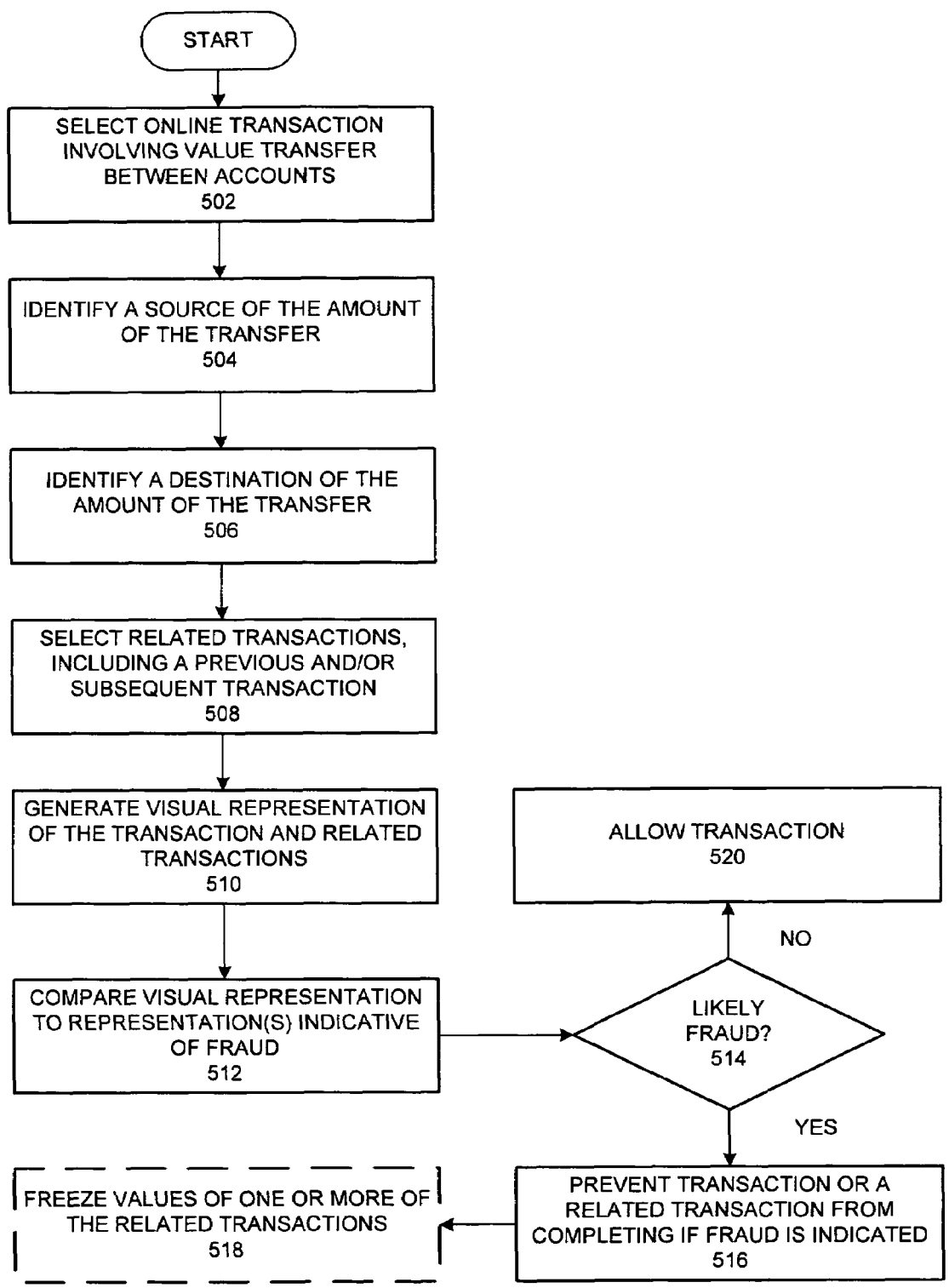
FIG. 5 is a flowchart demonstrating a method of visually depicting a set of on-line transactions conducted in an on-line system for transferring value between users, to facilitate the detection of fraud in the transactions, in accordance with an embodiment of the present invention.

FIG. 5 illustrates a method of visually depicting a set of on-line transactions conducted in an on-line system for transferring value between users, to facilitate the detection of fraud in the transactions, in accordance with an embodiment of the invention. In operation 502, a first on-line transaction involving a transfer of a first amount of value from a transferor account to a transferee account is selected. In operation 504, a source of the first amount is identified. In operation 506, a destination of the first amount is identified. In operation 508, multiple related transactions— including the first transaction—are selected. In this embodiment, the related transactions further include (a) a previous transaction involving a transfer of value to the transferor account from an account other than the transferor and transferee accounts, and/or (b) a subsequent transaction involving a transfer of value from the transferee account to an account other than the transferor and transferee accounts. In operation 510, a visual representation of the related transactions is generated. In operation 512, the generated visual representation is compared to one or more visual representations indicative of fraud. In operation 514, if the generated visual representation is deemed indicative of fraud, then the transaction is allowed in operation 516. Otherwise, in operation 518 one or more of the related transactions are prevented from completing and, in optional operation 520, values of one or more of the related transactions are frozen.

Figure 6:
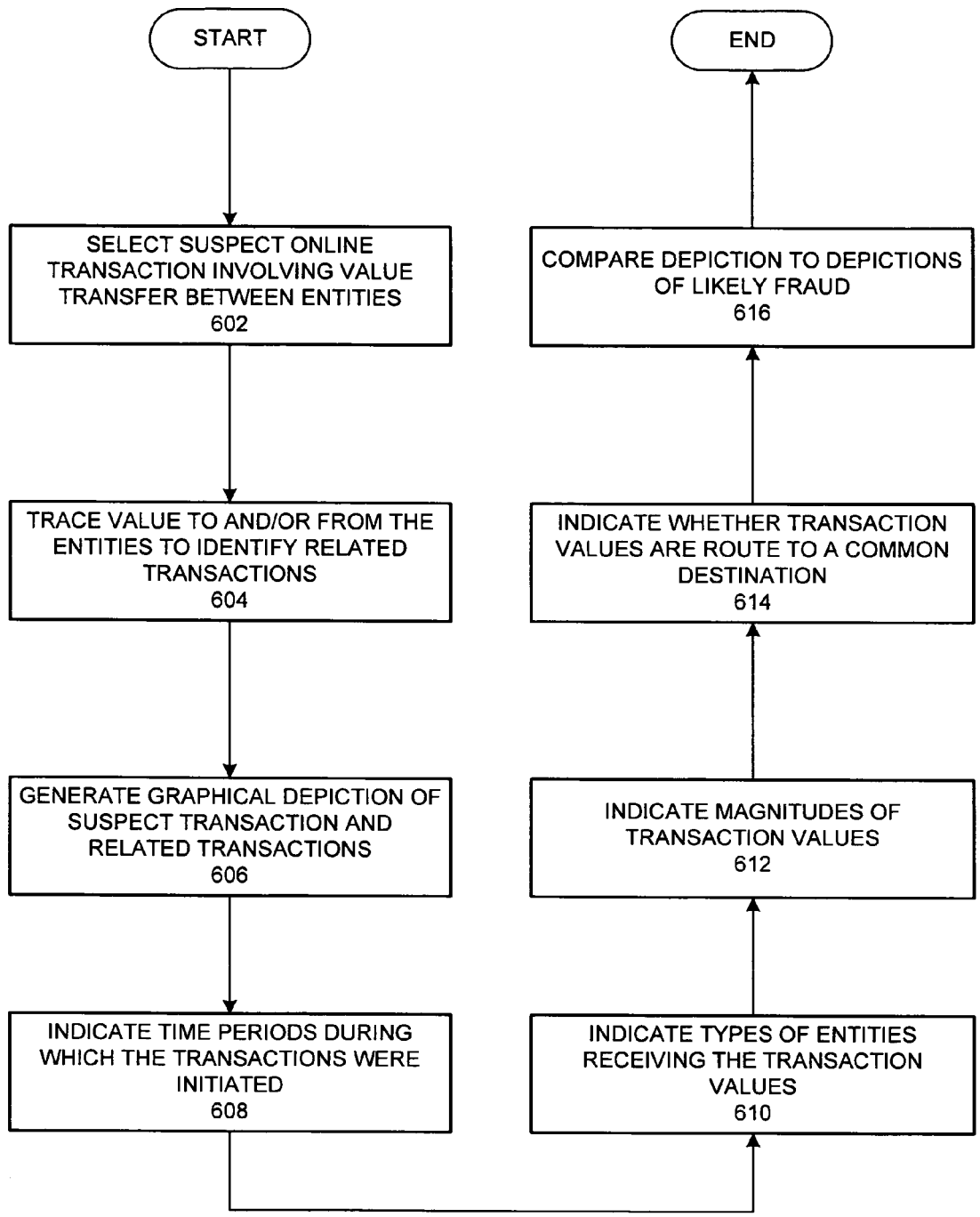
FIG. 6 is a flowchart demonstrating a method of facilitating the detection of fraud in a set of on-line transactions, in accordance with an embodiment of the present invention.

FIG. 6 depicts a method of facilitating the detection of fraud in a set of on-line transactions, in accordance with an embodiment of the invention. In operation 602, a suspect on-line transaction involving a transfer of value from a first entity to a second entity is selected; the selection is based on a parameter of the transaction. In operation 604, the value of the selected transaction is traced to identify a set of transactions related to the selected transaction. In this embodiment, the set of related transactions includes (a) a sequence of transactions involving at least one transfer of value to the first entity, from an entity other than the first and second entities, and/or (b) a sequence of transactions involving at least one transfer of value from the second entity, to an entity other than the first and second entities. In operation 606, a graphical depiction of the selected transaction and the set of related transactions is generated. In operation 608, the graphical depiction indicates relative time periods during which the selected transaction and the related transactions were initiated. In operation 610, the graphical depiction indicates the types of entities that receive the values of the selected transaction and the related transactions. In operation 612, the graphical depiction indicates the magnitudes of the values of the selected transaction and the related transactions. In operation 614, the graphical depiction indicates whether any of the selected transaction and the related transactions are routed toward a common destination for withdrawal. In operation 616, the graphical depiction is compared to depictions of likely fraud.

Figure 7:
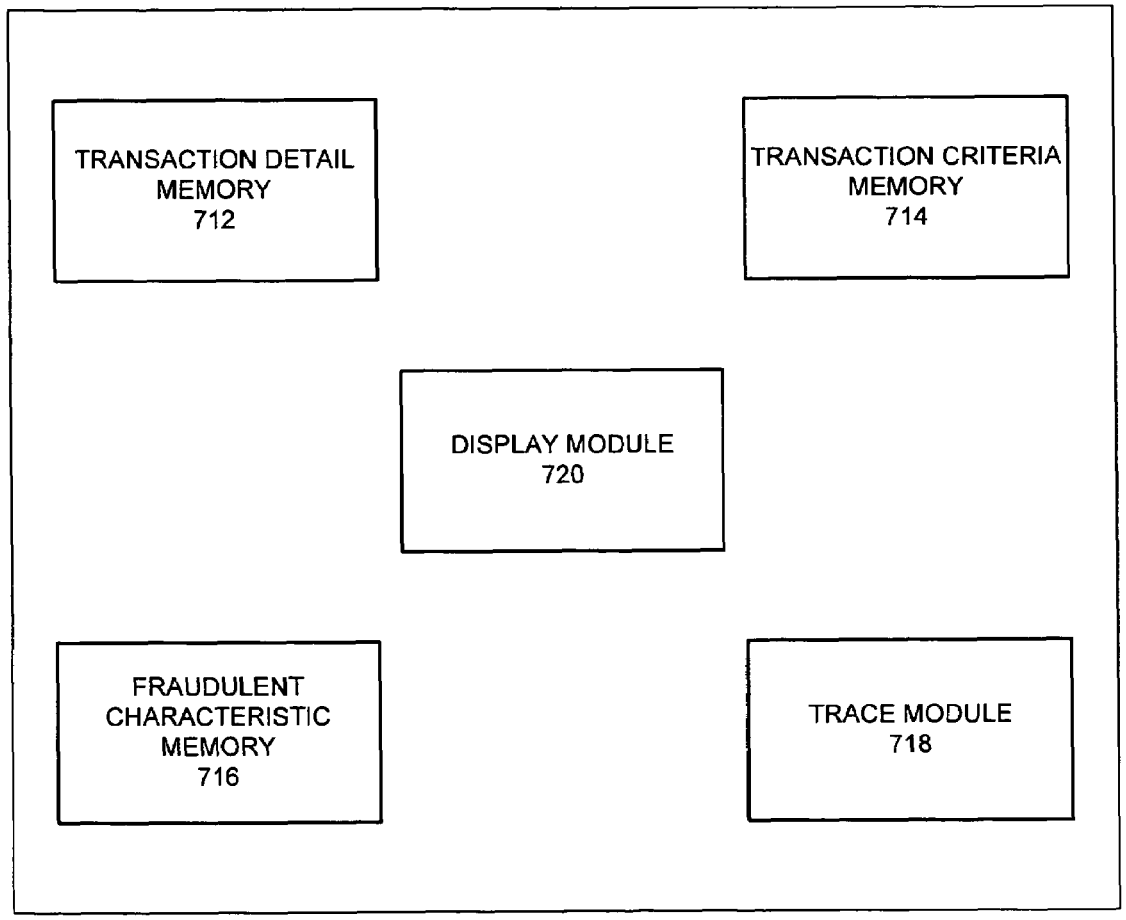
FIG. 7 is a block diagram of an apparatus for facilitating the detection of fraud within a set of on-line transactions involving the transfer of value between multiple entities, in accordance with an embodiment of the present invention.

FIG. 7 is a block diagram of an apparatus for facilitating the detection of fraud within a set of on-line transactions involving the transfer of value between multiple entities, in accordance with an embodiment of the invention. In this embodiment, fraud detection apparatus 700 comprises a first memory 712 configured to store a set of transaction details concerning value transfers between multiple entities and a second memory 714 configured to store a set of predetermined transaction criteria configured to identify a first transfer of value—between a first entity and a second entity—to be examined for fraudulent activity. Apparatus 700 also comprises trace module 718, which is configured to identify one or more of the multiple transfers related to the first transfer, wherein a second transfer is related to said first transfer if a series of value transfers can be traced between an entity involved in the second transfer and one or more of the first entity and the second entity. Apparatus 700 further comprises a third memory 716 configured to store a set of characteristics indicative of a fraudulent transfer, wherein the characteristics include one or more of: a maximum amount of a transfer, a network address of an initiator of a transfer, a geographical location of an initiator of a transfer, an age of an account of an initiator of a transfer, a number of successful transfers performed by an initiator of a transfer, and an amount of a transfer relative to a related transfer. Fraud detection apparatus 700 also comprises a display module 720 configured to graphically depict the related transfers as a connected graph for analysis for suspected fraudulent activity.

Figure 8:
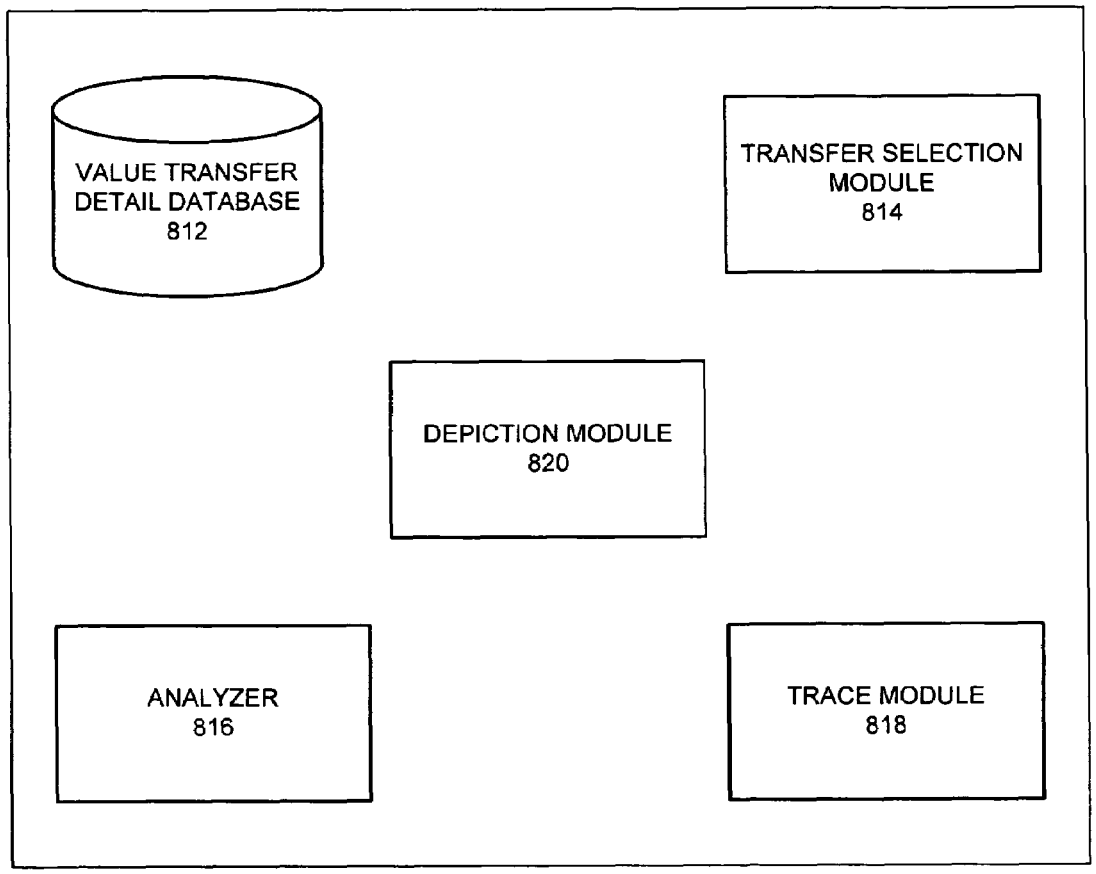
FIG. 8 is a block diagram of a system for facilitating on-line transfers of value and graphically depicting related on-line value transfers to facilitate detection of fraud among the transfers, in accordance with an embodiment of the present invention.

FIG. 8 is a block diagram of a system for facilitating on-line transfers of value and graphically depicting related on-line value transfers to facilitate detection of fraud among the transfers, in accordance with an embodiment of the invention. In this embodiment, on-line value transfer system 800 comprises database 812, which is configured to store details of value transfers conducted on-line, and selection module 814, which is configured to facilitate selection of a first value transfer involving the transfer of a first value from a first entity to a second entity. System 800 also comprises trace module 818, which is configured to trace one or more of: (a) an earlier series of value transfers ending with a transfer of value to the first entity from an entity other than the first entity and the second entity, and (b) a later series of value transfers starting with a transfer of value from the second entity to an entity other than the first entity and the second entity. On-line value transfer system 800 further comprises depiction module 820, which is configured to depict a sequence of value transfers, including the first value transfer and either or both of the earlier series of value transfers and the later series of value transfers. System 800 also comprises analyzer 816, which is configured to compare the depiction of the sequence of value transfers to one or more patterns of fraudulent value transfers.

The foregoing descriptions of embodiments of the invention have been presented for purposes of illustration and description only. They are not intended to be exhaustive or to limit the invention to the forms disclosed. Many modifications and variations may be apparent to practitioners skilled in the art. Accordingly, the above disclosure is not intended to limit the invention; the scope of the invention is defined by the appended claims. In particular, the types of transaction parameters depicted, and the visual, audible or other attributes used to depict them, may vary from one embodiment of the invention to another. These selections may depend on the reason for depicting the transactions—to find fraud, to determine a geographical area generating a large number of transactions (which may indicate a need for additional system resources), etc.

What is claimed is:

1. Within a system for transferring value between users of the system, a method of depicting value-transfer transactions, the method comprising:

receiving from a first user a first pending value-transfer transaction to transfer value from the first user to a second user;

graphically depicting one or more parameters of said first pending transaction;

graphically depicting a first entity representing the first user and a second entity representing the second user;

graphically depicting a set of connected transactions, including said first pending transaction, wherein two transactions are connected if they involve a common user and a transfer of value between the common user and at least one other user; and analyzing the set of connected transactions to determine if one or more of the transactions constitute fraud.

2. The method of claim 1, wherein said analyzing comprises: comparing said connected graph to one or more connected graphs indicative of fraudulent activity.

3. The method of claim 1, wherein said first value-transfer transaction involves the transfer of a value exceeding a threshold value.

4. The method of claim 3, wherein said transfer is a removal of said value from the system.

5. The method of claim 1, wherein said receiving comprises identifying multiple transactions conducted within a threshold period of time.

6. The method of claim 1, wherein said graphically depicting one or more parameters comprises generating a connected graph.

7. The method of claim 6, wherein said first transaction is depicted as an edge in said connected graph.

8. The method of claim 6, wherein a first parameter in said one or more parameters is represented in said connected graph by a first visual attribute.

9. The method of claim 6, wherein a first parameter in said one or more parameters is represented in said connected graph by a first aural attribute.

10. The method of claim 1, wherein said one or more parameters include one or more of: a magnitude of said value of said first transaction, a time period during which said first transaction was conducted, a location of the first user, and a location of the second user.

11. The method of claim 1, further comprising:
preventing said first transaction from closing until completion of said analyzing.

12. The method of claim 1, wherein the set of connected transactions comprises transfers of value between three or more user accounts within the system for transferring value between users.

13. A method of visually depicting a set of on-line transactions, conducted in an on-line system for transferring value between users, to facilitate the detection of fraud in the transactions, the method comprising:
selecting a first on-line transaction involving a transfer of a first amount from a first transferor account to a first transferee account;
identifying a source of said first amount;
identifying a destination of said first amount;
selecting multiple related transactions, including said first transaction, wherein the related transactions include one or more of:
a previous transaction involving a transfer of value to said first transferor account from an account other than said first transferor and said first transferee; and
a subsequent transaction involving a transfer of value from said first transferee account to an account other than said first transferor and said first transferee;
generating a first visual representation of the related transactions;
comparing said first visual representation to one or more visual representations indicative of fraud; and
if said first visual representation is indicative of fraud, preventing one or more of the related transactions from completing.

14. The method of claim 13, further comprising:
if said first visual representation is indicative of fraud, freezing the values of one or more of the related transactions.

15. The method of claim 13, wherein said identifying a source comprises identifying a credit card that was charged said first amount.

16. The method of claim 13, wherein said comparing comprises determining if the related transactions are configured to transfer the values of the related transactions to a single destination.

17. The method of claim 13, wherein said identifying a destination comprises identifying a removal of said first amount from the on-line system.

18. The method of claim 13, wherein said visual representation is a connected graph of transaction chains having a common nexus.

19. The method of claim 18, wherein said common nexus is said destination.

20. The method of claim 18, wherein a transaction chain comprises a series of consecutive value transfers involving one or more entities that act as a transferee account and a transferor account, respectively, in consecutive transfers.

21. The method of claim 18, wherein said generating comprises:
depicting said first transaction as a first edge of said connected graph;
depicting said first transferor account as a first node of said connected graph; and
depicting said first transferee account as a second node of said connected graph;
wherein said first node and said second node are connected by said first edge.

22. The method of claim 21, wherein one or more visual attributes of said first edge represent one or more of said first value and a time period during which said first transaction was conducted.

23. The method of claim 21, wherein a first visual attribute of said first node represents a type of entity describing said first transferor account.

24. The method of claim 23, wherein said type of entity is one of the set of: a credit card, a bank account, a user and a user account in the on-line system.

25. The method of claim 13, wherein said first transaction is pending at the time it is selected.

26. A method of facilitating detection of fraud in a set of on-line transactions, the method comprising:
selecting a suspect on-line transaction based on a parameter of said suspect transaction, wherein said suspect transaction includes a transfer of value from a first entity to a second entity and is suspected of involving fraud;
tracing the flow of said value to identify a first set of transactions related to said suspect transaction, the first set of transactions including one or more of:
a sequence of transactions involving at least one transfer of value to the first entity from an entity other than the first entity and the second entity; and
a sequence of transactions involving at least one transfer of value from the second entity to an entity other than the first entity and the second entity;
generating a graphical depiction of said suspect transaction and said first set of related transactions to:
indicate relative time periods during which said suspect transaction and each transaction in said first set of related transactions was initiated;
indicate a type of entity receiving the value of said suspect transaction and each transaction in said first set of related transactions;
indicate a magnitude of value of said suspect transaction and each transaction in said first set of related transactions; and
indicate whether any of said values of said suspect transaction and said first set of related transactions are routed toward a common destination for withdrawal; and
comparing said depiction of said suspect transaction and said first set of related transactions to depictions of likely fraud.

27. The method of claim 26, wherein said graphically depicting comprises:
generating a connected graph representing said related transactions, said graph including edges and vertices, wherein said edges represent said related transactions and said vertices represent entities involved in said related transactions;
setting a first visual attribute of each said edge according to a first parameter of each said related transaction; and
setting a first visual attribute of each said vertex according to a first parameter of each said entity.

28. The method of claim 27, wherein said first visual attribute of each said edge is a color, and said first parameter of each said related transaction is a time of said related transaction.

29. The method of claim 27, wherein said first visual attribute of each said vertex is a color, and said first parameter of each said entity is a type of said entity.

30. The method of claim 28, further comprising setting a second visual attribute of each said edge according to a second parameter of each said related transaction.

31. The method of claim 30, wherein said second visual attribute of each said edge is a size, and said second parameter of each said related transaction is a magnitude of value transferred in said related transaction.

32. The method of claim 26, wherein said suspect on-line transaction was initiated by the first entity in an attempt to steal the value of said suspect transaction.

33. The method of claim 26, further comprising:
holding said suspect transaction until completion of said comparing.

34. A computer readable storage medium storing instructions that, when executed by a computer, cause the computer to perform a method of depicting value-transfer transactions within a system for transferring value between users of the system, the method comprising:
receiving from a first user a first pending value-transfer transaction to transfer value from the first user to a second user;
graphically depicting one or more parameters of said first pending transaction;
graphically depicting a first entity representing the first user and a second entity representing the second user;
graphically depicting a set of connected transactions, including said first pending transaction, wherein two transactions are connected if they involve a common user and a transfer of value between the common user and at least one other user; and
analyzing the set of connected transactions to determine if one or more of the transactions constitute fraud.

35. An apparatus for facilitating the detection of fraud within a set of on-line transactions involving the transfer of value between multiple entities, the apparatus comprising:
a first memory configured to store a set of transaction details concerning value transfers between multiple entities;
a second memory configured to store a set of predetermined transaction criteria configured to identify a first transfer of value between a first entity and a second entity to be examined for fraudulent activity;
a trace module configured to identify one or more of said multiple transfers related to said first transfer, wherein a second transfer is related to said first transfer if a series of value transfers can be traced between an entity involved in said second transfer and one or more of said first entity and said second entity;
a third memory configured to store a set of characteristics indicative of a fraudulent transfer, said characteristics including one or more of: a maximum amount of a transfer, a network address of an initiator of a transfer, a geographical location of an initiator of a transfer, an age of an account of an initiator of a transfer, a number of successful transfers performed by an initiator of a transfer, and an amount of a transfer relative to a related transfer; and
a display module configured to graphically depict said related transfers as a connected graph for analysis for suspected fraudulent activity.

36. A system for facilitating on-line transfers of value and graphically depicting related on-line value transfers to facilitate detection of fraud among the transfers, the system comprising:
a database configured to store details of value transfers initiated on-line;
a selection module configured to facilitate a selection of a first value transfer involving the transfer of a first value from a first entity to a second entity;
a trace module configured to trace one or more of:
an earlier series of value transfers ending with a transfer of value to the first entity from an entity other than the first entity and the second entity; and
a later series of value transfers starting with a transfer of value from the second entity to an entity other than the first entity and the second entity;
a depiction module configured to depict a sequence of value transfers, including said first value transfer and one or more of said earlier series of value transfers and said later series of value transfers; and
an analyzer configured to compare said depiction of said sequence of value transfers to one or more patterns of fraudulent value transfers.

37. A computer readable storage medium storing instructions that, when executed by a computer, cause the computer to perform a method of facilitating detection of fraud in a set of on-line transactions, to facilitate the detection of fraud in the transactions, the method comprising:
selecting a suspect on-line transaction based on a parameter of said suspect transaction, wherein said suspect transaction includes a transfer of value from a first entity to a second entity and is suspected of involving fraud;
tracing the flow of said value to identify a first set of transactions related to said suspect transaction, the first set of transactions including one or more of:
a sequence of transactions involving at least one transfer of value to the first entity from an entity other than the first entity and the second entity; and
a sequence of transactions involving at least one transfer of value from the second entity to an entity other than the first entity and the second entity;
generating a graphical depiction of said suspect transaction and said first set of related transactions to:
indicate relative time periods during which said suspect transaction and each transaction in said first set of related transactions was initiated;
indicate a type of entity receiving the value of said suspect transaction and each transaction in said first set of related transactions;
indicate a magnitude of value of said suspect transaction and each transaction in said first set of related transactions; and
indicate whether any of said values of said suspect transaction and said first set of related transactions are routed toward a common destination for withdrawal; and
comparing said depiction of said suspect transaction and said first set of related transactions to depictions of likely fraud.

38. A computer readable storage medium storing instructions that, when executed by a computer, cause the computer to perform a method of visually depicting a set of on-line transactions, conducted in an on-line system for transferring value between users, to facilitate the detection of fraud in the transactions, the method comprising:
selecting a first on-line transaction involving a transfer of a first amount from a first transferor account to a first transferee account;
identifying a source of said first amount;
identifying a destination of said first amount;

selecting multiple related transactions, including said first transaction, wherein the related transactions include one or more of:
　a previous transaction involving a transfer of value to said first transferor account from an account other than said first transferor and said first transferee; and
　a subsequent transaction involving a transfer of value from said first transferee account to an account other than said first transferor and said first transferee;

generating a first visual representation of the related transactions;

comparing said first visual representation to one or more visual representations indicative of fraud; and if said first visual representation is indicative of fraud, preventing one or more of the related transactions from completing.

\* \* \* \* \*